United States Patent
Hayes, Jr. et al.

(10) Patent No.: US 8,243,893 B2
(45) Date of Patent: *Aug. 14, 2012

(54) CUSTOMER MESSAGING SERVICE

(75) Inventors: Marc F. Hayes, Jr., Roswell, GA (US);
Sean M. Sweeney, Minneapolis, MN (US); Ronald L. Argo, Suwanee, GA (US)

(73) Assignee: Accenture Global Services Limited, Dublin (IE)

( * ) Notice: Subject to any disclaimer, the term of this patent is extended or adjusted under 35 U.S.C. 154(b) by 199 days.

This patent is subject to a terminal disclaimer.

(21) Appl. No.: 12/689,794

(22) Filed: Jan. 19, 2010

(65) Prior Publication Data

US 2010/0183125 A1 Jul. 22, 2010

Related U.S. Application Data

(63) Continuation of application No. 11/016,353, filed on Dec. 17, 2004, now Pat. No. 7,653,573, which is a continuation of application No. 09/876,563, filed on Jun. 7, 2001, now abandoned.

(51) Int. Cl.
*H04M 1/64* (2006.01)
*H04M 1/725* (2006.01)
*G06Q 30/00* (2012.01)
(52) U.S. Cl. .................. 379/88.23; 455/412.1; 705/26
(58) Field of Classification Search .... 379/88.01–88.25; 455/412.1; 705/26; 709/207, 220
See application file for complete search history.

(56) References Cited

U.S. PATENT DOCUMENTS

| | | | |
|---|---|---|---|
| 5,895,466 A | 4/1999 | Goldberg et al. | |
| 5,903,845 A | 5/1999 | Buhrmann et al. | |
| 6,023,700 A | 2/2000 | Owens et al. | |
| 6,308,160 B1 | 10/2001 | Rex | |
| 6,401,085 B1 | 6/2002 | Gershman et al. | |
| 6,549,773 B1 * | 4/2003 | Linden et al. | 455/426.1 |
| 6,618,763 B1 * | 9/2003 | Steinberg | 709/246 |
| 6,771,756 B1 * | 8/2004 | Chou et al. | 379/201.01 |
| 7,076,241 B1 | 7/2006 | Zondervan | |
| 7,092,699 B1 | 8/2006 | Hefter | |
| 7,142,841 B1 | 11/2006 | Almassy | |
| 7,274,926 B1 * | 9/2007 | Laumen et al. | 455/414.1 |
| 7,920,101 B2 * | 4/2011 | Lum et al. | 345/2.1 |
| 2001/0056359 A1 | 12/2001 | Abreu | |

(Continued)

FOREIGN PATENT DOCUMENTS

WO WO 97/41654 11/1997

(Continued)

OTHER PUBLICATIONS

"Convergys to market Neuromedia's web sales and support software"; Telecomworld; Coventry; Apr. 18, 2000.

(Continued)

*Primary Examiner* — Davetta W Goins
*Assistant Examiner* — Mohammad Islam
(74) *Attorney, Agent, or Firm* — Fish & Richardson P.C.

(57) ABSTRACT

A messaging and alerting service is described. An implementation includes enrolling a customer in the messaging and alert service, storing a list of businesses selected by the customer, storing a customer contact hierarchy list, and contacting the customer according to the contact hierarchy list. The messaging and alerting service enables real-time, interactive alerts to be delivered to customers in the customer's preferred media. In addition, customers may respond to the alerts to provide important directions to a business.

20 Claims, 16 Drawing Sheets

U.S. PATENT DOCUMENTS

| | | | |
|---|---|---|---|
| 2002/0002509 A1 | 1/2002 | Wagorn et al. | |
| 2002/0025798 A1* | 2/2002 | Titmuss et al. | 455/412 |
| 2002/0032602 A1* | 3/2002 | Lanzillo et al. | 705/14 |
| 2002/0046299 A1 | 4/2002 | Lefeber et al. | |
| 2002/0107002 A1* | 8/2002 | Duncan et al. | 455/412 |
| 2004/0122730 A1* | 6/2004 | Tucciarone et al. | 705/14 |

FOREIGN PATENT DOCUMENTS

| | | |
|---|---|---|
| WO | WO 00/73947 | 12/2000 |
| WO | WO 01/37589 | 5/2001 |

OTHER PUBLICATIONS

"OAG selects EnvoyWorldWide to Help Business Customers Stay Ahead of Last-Minute Flight Delays and Cancellations'" NEWS; Mar. 21, 2001 web page; captured via the Wayback Machine.

"Oraclemobile.com spin-off to focus on wireless"; CENT News.com; Feb. 22, 2000; Stephanie Miles.

Aberg et al., "Collection and Exploitation of Expert Knowledge in Web Assistant Systems" Proceedings of the 34$^{th}$ Hawaii International Conferences on System Sciences, 2001, pp. 1-10.

Albert, "Albert and fast search & transfer form strategic alliance to market integrated natural language query search engine", PR Newswire, Apr. 4, 2000.

Anonymous, "Linking Instant Messaging to Publish/Subscribe Messaging", Research Disclosure, Mason Publications, Hampshire, Great Britain, No. 438, Oct. 1, 2000, at p. 1875.

Mindfuleye, "Mindfuleye.com's artificial intelligence technology monitors "moods" of exchanges anD stocks", PR Newswire, Jun. 29, 2000.

Neuromedia vrep1, "Convergys and Neuromedia team-up to market natural language web sales and support solution", Business Wire, Apr. 17, 2000.

Neuromedia vrep2, "Neuromedia builds momentum, sghs new customers to create virtual representatives; end-of-year marks achievements in customer, partner, revenue and technology milestones", Business Wire, Dec. 13, 1999.

Neuromedia vrep3, "Neuromedia announces neuroservice solution for online customer support vReps", Business Wire, Nov. 8, 1999.

Neuromedia vrep4, "Neuromedia unveils neurocommerce solution for online sales & service vReps", Business Wire, Nov. 9, 1999.

Canadian Office Action for Application No. 2,453,231 dated Apr. 5, 2012, 6 pages.

* cited by examiner

Customer Messaging Alerting Service

Contact Preference Stream Name: [Business Alerts ▾]

Notification Method

1. [AOL Instant Messenger ▾]
2. [Text Pager ▾]
3. [Mobile Phone ▾]
4. [ ▾]
5. [ ▾]

Require Confirmation?

| Yes | No |
|---|---|
| ● | ○ |
| ● | ○ |
| ○ | ● |
| ○ | ○ |
| ○ | ○ |

[SAVE]  [CANCEL]

FIG. 2C

| Component | Feature | Example |
|---|---|---|
| Contact Profile | Information | Phone information, IM information, Pager information |
| Contact Preference | Mode of Contact | How the customer wants to be contacted |
| Contact Preference | Time of Contact | When the customer wants to be contacted |
| Contact Preference | Hours of the Day | What particular time is preferred |
| Contact Preference | Time Zone | EST, PST, GMT |
| Account | Provider | Airline, Package Delivery Co., Financial Services Co. |
| Other Preference | Personalization | Where can I personalize the service |
| Other Preference | Activity | Business Event, Personal Alerts |
| Other Preference | Language | Language preference |
| Service Preference | Definition | Selecting AOL/Yahoo ID's, Passwords |
| Service Preference | Company Selection | Entering information for Various Account Nos. |

FIG. 2D

| Device/Service | Native Authentication | CMAS Secondary Authentication | Cookies | Other |
|---|---|---|---|---|
| Web Browser | Microsoft Passport | CMAS user ID/Password | Yes | None |
| WAP Phone | Varies | CMAS user ID/Password | Simulated | Security as provided by the Service provider |
| Cell Phone | Varies | CMAS user ID/Password | None | Security as provided by the Service provider |
| Instant Messenger | All require a userID/Password | CMAS user ID/Password | None | None |
| Windows CE hand held | Microsoft Passport | CMAS user ID/Password | Simulated | Security as provided by the Service provider |
| Cell Phone Based Pager | Varies | CMAS user ID/Password | None | Security as provided by the Service provider |
| Palm Hand Held | Microsoft Passport | CMAS user ID/Password | Simulated | Security as provided by the Service provider |
| Two-Way Pagers | Varies | CMAS user ID/Password | None | Security as provided by the Service provider |
| Mobile Phone Voice Mail | Outbound from initial configuration | None | None | Security as provided by the Service provider |
| Interactive Pager | Outbound from initial configuration | None | None | Security as provided by the Service provider |
| Short Message Services | Outbound from initial configuration | None | None | Security as provided by the Service provider |
| Alpha/Numeric Pager | Outbound from initial configuration | None | None | Security as provided by the Service provider |
| Business Phone | Outbound from initial configuration | None | None | Security as provided by the Service provider |
| Business Voice Mail | Outbound from initial configuration | None | None | Security as provided by the Service provider |
| Home Number | Outbound from initial configuration | None | None | Security as provided by the Service provider |
| Alternative Business Contact | Outbound from initial configuration | None | None | Security as provided by the Service provider |

*FIG. 5C*

| Service | Device | Presence Detection | Delivery Confirmation | Guaranteed Delivery | Receipt Acknowledge | |
|---|---|---|---|---|---|---|
| | | | | | Native 147 | Manual 149 |
| AOL | Any Device that has AOL Instant Messenger | ✓ | — | — | — | ✓ |
| Yahoo! | Any Device that has Yahoo Instant Messenger | ✓ | — | — | — | ✓ |
| Microsoft | Any Device that has MSN Instant Messenger | ✓ | — | — | — | ✓ |
| Pager | Interactive Pager | — | Varies | Some | Some | — |
| Pager | Alpha/Numeric Pager | — | Varies | Some | — | ✓ |
| Pager | Cell Phone Based Pager | — | Varies | Some | — | — |
| Pager | Two-Way Pagers | — | Varies | Some | ✓ | — |
| Wireless enabled PDA | PDA | — | ✓ | Some | Some | ✓ |
| Wireless enabled PDA | Windows CE | — | ✓ | Some | Some | ✓ |
| Voice Mail | Mobile Phone Voice Mail | — | — | ✓ | — | — |
| Voice Mail | Business Voice Mail | — | — | ✓ | — | — |
| Voice Call | Business Phone | — | — | ✓ | — | ✓ |
| Voice Call | Home Number | — | — | ✓ | — | ✓ |
| Voice Call | Alternative Business Contact | — | — | ✓ | — | ✓ |
| Voice Call | Mobile Phone | — | — | ✓ | — | ✓ |
| SMS | SMS Capable Device | — | Varies | ✓ | — | ✓ |
| WAP | WAP Micro-browser capable device | ✓ | ✓ | — | ✓ | — |
| WAP | WAP Phone | — | ✓ | — | ✓ | — |
| Email | Email Client | — | ✓ | — | ✓ | ✓ |

FIG. 5D

CUSTOMER MESSAGING SERVICE

CROSS-REFERENCE TO RELATED APPLICATIONS

This application is a continuation of U.S. patent application Ser. No. 11/016,353, filed Dec. 17, 2004, which is a continuation of U.S. patent application Ser. No. 09/876,563, filed Jun. 7, 2001, the disclosures of which are all incorporated herein by reference in their entireties.

BACKGROUND OF THE INVENTION

The invention pertains to a customer messaging and alerting service. In particular, the service provides for multi-channel communications between customers and businesses, and provides a means for businesses to create alerts for target customers that are routed via each customer's specified alert hierarchy.

Electronic interactions between a business and its customers currently are typically reactive, responding to each customer request separately. In addition, business responses are typically rigid, tending to be seller-centric. For example, some companies offer only one or two ways for customer interaction with customer service personnel and only for specified time periods. Thus, customers must do business with their suppliers under each company's terms, and the customer support infrastructure is used only when a customer requests assistance.

One of the most popular forms of communicating privately between persons, one-on-one, via personal computer (PC) and other devices, including personal digital assistants (PDA) and Web-enabled phones, is called instant messaging. There are various forms of instant messaging systems that do not work with one another, such as America Online's Instant Messenger and Yahoo! Messenger. But each of the instant-messaging systems allow a user to create a special list that enables the user to be informed when a "buddy" (one of the users on the special list) has come online, and that person is also informed that the user is online. The system works because a piece of client software running on each person's PC allows a connection to an Instant Messaging server to be made, and permits the user to be logged into the server by supplying the user's screen name and a password. The client software then sends a list of "buddies" to the server, which checks to see if anyone on the list is currently online, and continues checking as long as the user runs the client software.

It is estimated that 130 million people currently use Instant Messaging software, and that about 1.5 billion instant messages are sent daily. The United States Postal Service, in comparison, handles approximately 660 million letters per day. The use of instant messaging software is thus becoming more popular as the number of people utilizing the internet continues to increase. Businesses have recognized this trend, and various instant messaging providers are developing wireless communication applications, for such devices as mobile telephones, pagers, web-enabled digital telephones, personal digital assistants and other devices.

In view of these trends, businesses hoping to provide excellent customer service must not only be concerned about staffing call centers with knowledgeable personnel, but also must be concerned about how to locate and communicate with highly mobile and computer-savvy customers. It is clear that offering a toll-free telephone number for contacting customer representatives eight hours a day is no longer acceptable in today's fast-paced, digital environment.

SUMMARY OF THE INVENTION

Presented is a customer messaging and alerting service (CMAS). An implementation includes enrolling a customer in a messaging and alert service, storing a list of businesses selected by the customer, storing a customer contact hierarchy list, and contacting the customer according to the customer contact hierarchy when at least one of the selected businesses has an alert for the customer.

The CMAS may include one or more of the following features. A customer may enroll by providing information to at least one of a participating business website, a customer messaging and alert service website, and to a customer services representative. A customer contact hierarchy list may include at least one of telephone information, instant messaging information, e-mail information, pager information and wireless device information. A list of customer preferences may be stored that includes at least one of selected businesses to contact, selected businesses authorized to send alert messages, when the customer may be contacted and types of messages that require confirmation. The customer may be permitted to contact any of the selected businesses. The customer may submit a natural language query that is interpreted by the messaging and alert service.

CMAS is a system for business service providers that provides a customer messaging and alerting service enabling real-time, interactive alerts to be delivered to customers in the customer's preferred media. These alerts are "actionable" meaning that customers can respond to those alerts providing important direction to the business enterprise. As an example, a customer may be alerted that a field service technician will be dispatched to their place of business in 30 minutes, and the customer can either accept the service dispatch time or ask for a rescheduled time. In either case, more efficient business operations are the result.

CMAS also provides a reusable business and technical architecture to automatically respond to "natural language" requests for care from customers in message media (e.g. AOL Instant Messenger). CMAS creates a "corporate persona" in the instant messenger service (for example, a "Package Company Helper" AOL Instant Messenger helper that is always available in a customer's list of "buddies"). CMAS provides pre-built "customer intents" that are designed to respond to the most frequent customer requests.

Furthermore, CMAS provides reusable customer profiles enabling more effective customer communications. Customers define their communications profile once and then enable their supplier's to use those profiles. The communication profile includes important attributes like devices (e.g., web phone) and services (e.g., Yahoo! Messenger) and addresses (e.g., Assistant's telephone number) and preferred order of contact. A permission-marketing model protects these customer profiles and restricts access to only those suppliers expressly authorized by the profile. This model enables a more effective, "write once, use many" approach creating greater efficiency and effectiveness from the customer's perspective and from the business' perspective.

The CMAS engine enables businesses to shape, and in some cases reshape, many of their electronic customer interactions to keep customers happy and informed. CMAS also reduces the cost of customer service by automating many of the tasks formerly handled by customer service representatives or other human assisted means, increases customer satisfaction, and minimizes the problems associated with locating customers in today's dynamic world of increasingly transient and mobile customers. CMAS promotes customer satisfaction, retention and loyalty, which results in increased revenues because such customers tend to buy more products and services. Thus, CMAS captures some of the original electronic customer relationship management value first recognized as the internet started to develop into a viable business medium.

Other features and advantages of the invention will be apparent from the detailed description set forth below, from the drawings and from the appended claims.

BRIEF DESCRIPTION OF THE DRAWINGS

FIGS. 2A-2C are simplified computer screen shots illustrating an implementation of the enrollment process followed by a customer to enroll in the CMAS.

FIG. 2D is a table listing the types of customer profile data that CMAS may acquire for customers.

FIG. 5C is a table illustrating authentication mechanisms by device type for use with a CMAS system according to the invention.

FIG. 5D is a service and delivery information table illustrating the types of services that may be supported by a CMAS system according to the invention.

Like reference numbers in the drawings indicate like elements.

DETAILED DESCRIPTION

Figure 1:
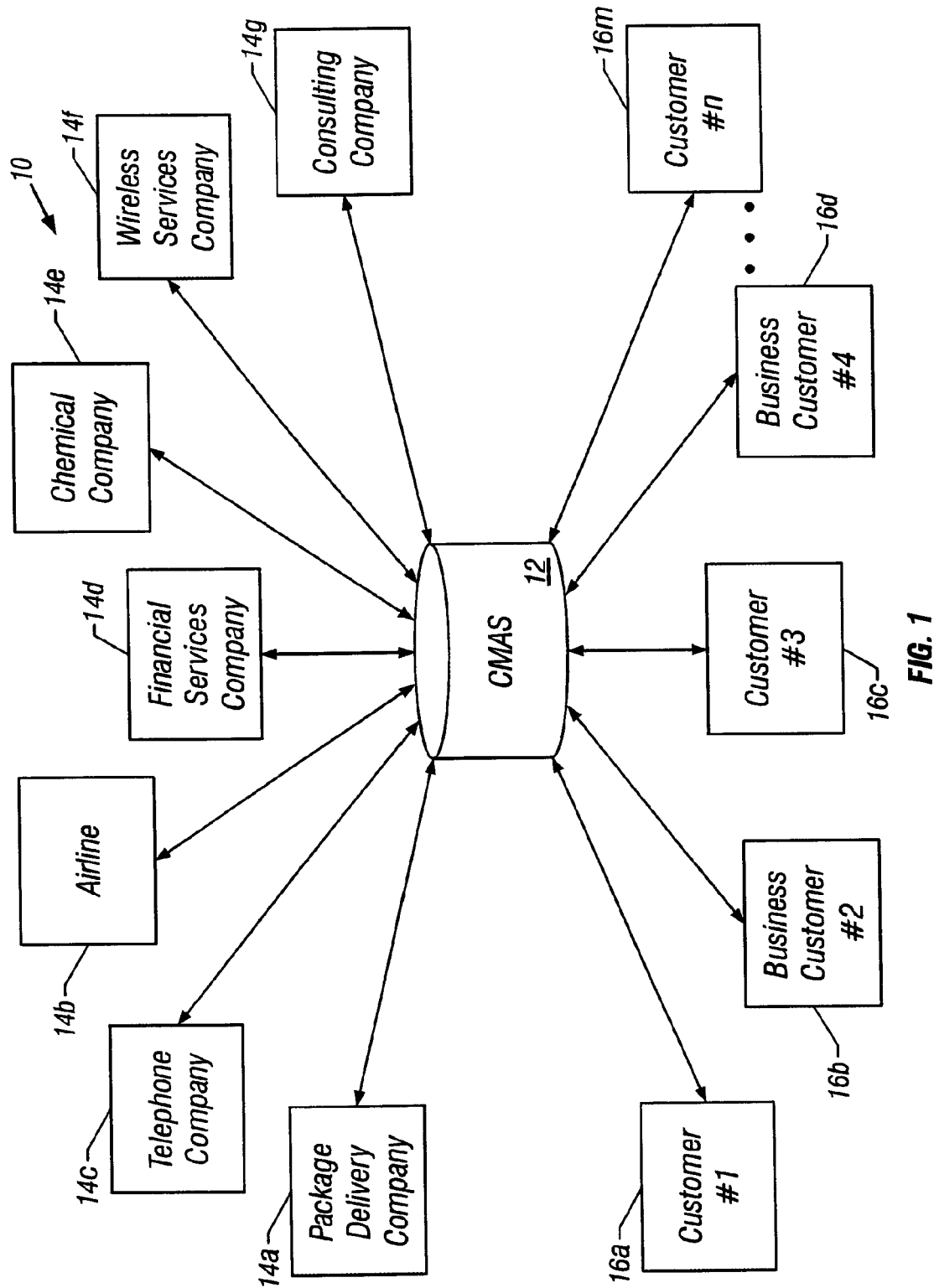
FIG. 1 is a simplified block diagram of a customer messaging and alerting service (CMAS) according to the invention.

FIG. 1 is a simplified block diagram 10 of a customer messaging and alerting service (CMAS) 12 that connects a plurality of different types of businesses 14a-14g to a plurality of customers 16a-16n. A customer may be defined as a person, business entity or employee of a business that uses and subscribes to the CMAS services. A particular customer may have multiple devices at her disposal for communication, any or all of which may be designated for communications with chosen businesses. In an implementation, the customer may wish to request information from one or more of the businesses affiliated with the CMAS. For example, customer 16a may use a computer running instant-messaging software, an e-mail program and a website chat program, while customer 16b may also utilize a computer, a wireless phone and a personal digital assistant with wireless communications capability. As long as both customer 16a and 16b are enrolled, which is explained below, both can use any of their devices to communicate with one or more businesses of their choice.

A feature of the CMAS system is the capability for a customer to use instant messaging as a communications tool to request information. The customer generates a "special list" of "buddies" that include chosen businesses so that conversational, humanistic customer care can be delivered to that customer. If instant messaging is used, then conversational, humanistic customer care may be delivered by what some consider to be the most natural and personal electronic interface medium. Further, the CMAS system may include natural language processing (NLP) that permits a customer to form natural language queries that can be interpreted and answered based on industry-specific and enterprise-specific customer intention models. Each company may develop its own proprietary, industry-specific business processes codified in the natural language processing linguistics and intent-response models used for their field. Some examples of how such natural language queries may be formed, interpreted and answered will be given below.

Another feature of the CMAS system is that an enterprise or company may create business-specific alert messages, and target customers to receive such alerts via customer-specified alert hierarchies until the alert is delivered. The CMAS system is therefore "customer-centric" in that each customer must grant permission to be contacted by one or more chosen companies. The customer thus controls who, how and when their suppliers may contact them.

A customer may sign up for the CMAS services in a number of ways, may specify or control which businesses and what type of communications will be acceptable, and may define a hierarchy of contact means for receiving alerts. The CMAS service maintains the customer profiles, may specify employment groups that certain sets of customers belong to, and may periodically send bulk e-mail notices to customers to ensure that profile data is accurate and current. The system permits a customer to communicate with a plurality of different suppliers in the same manner.

Figure 2A:
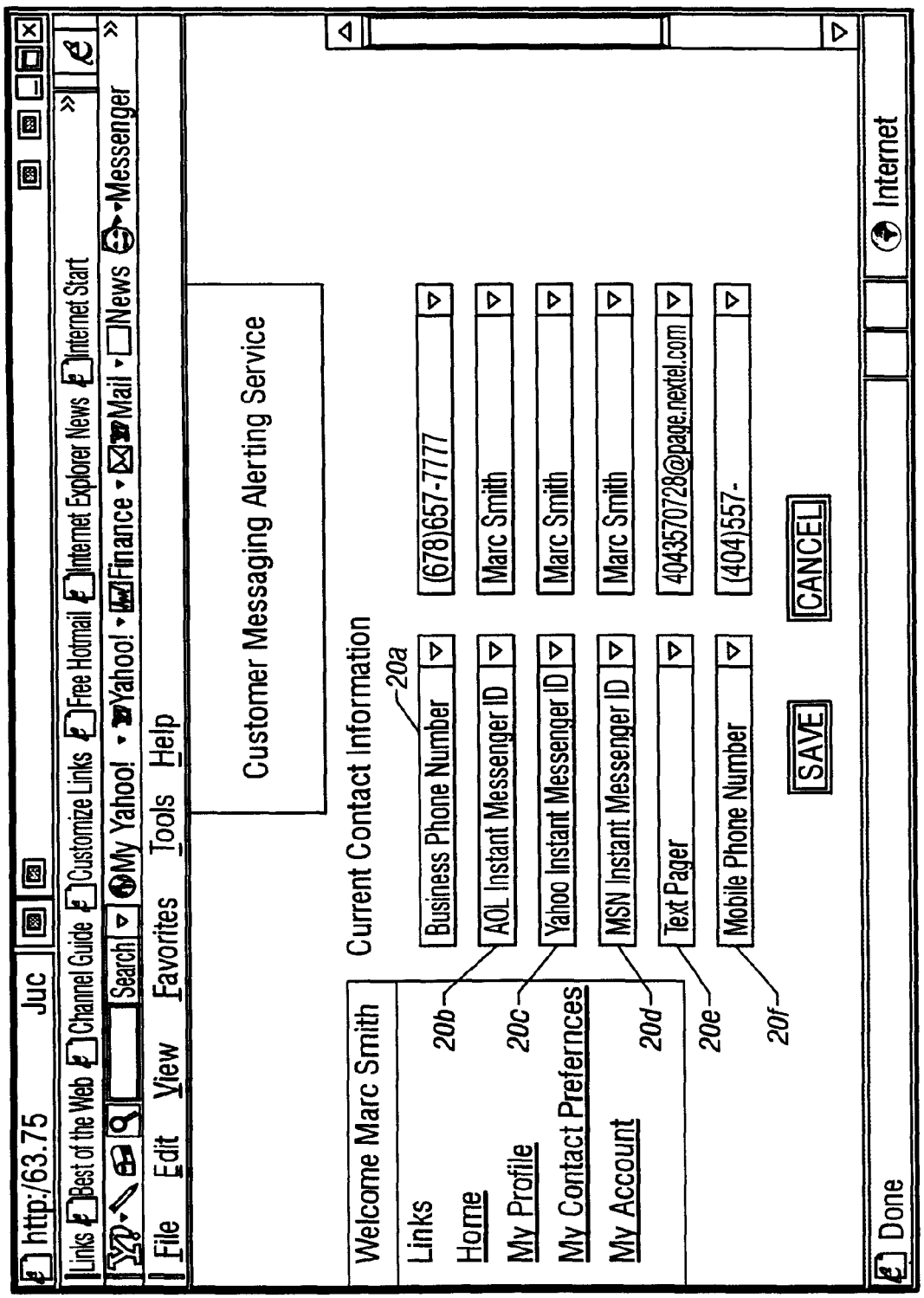
Figure 2B:
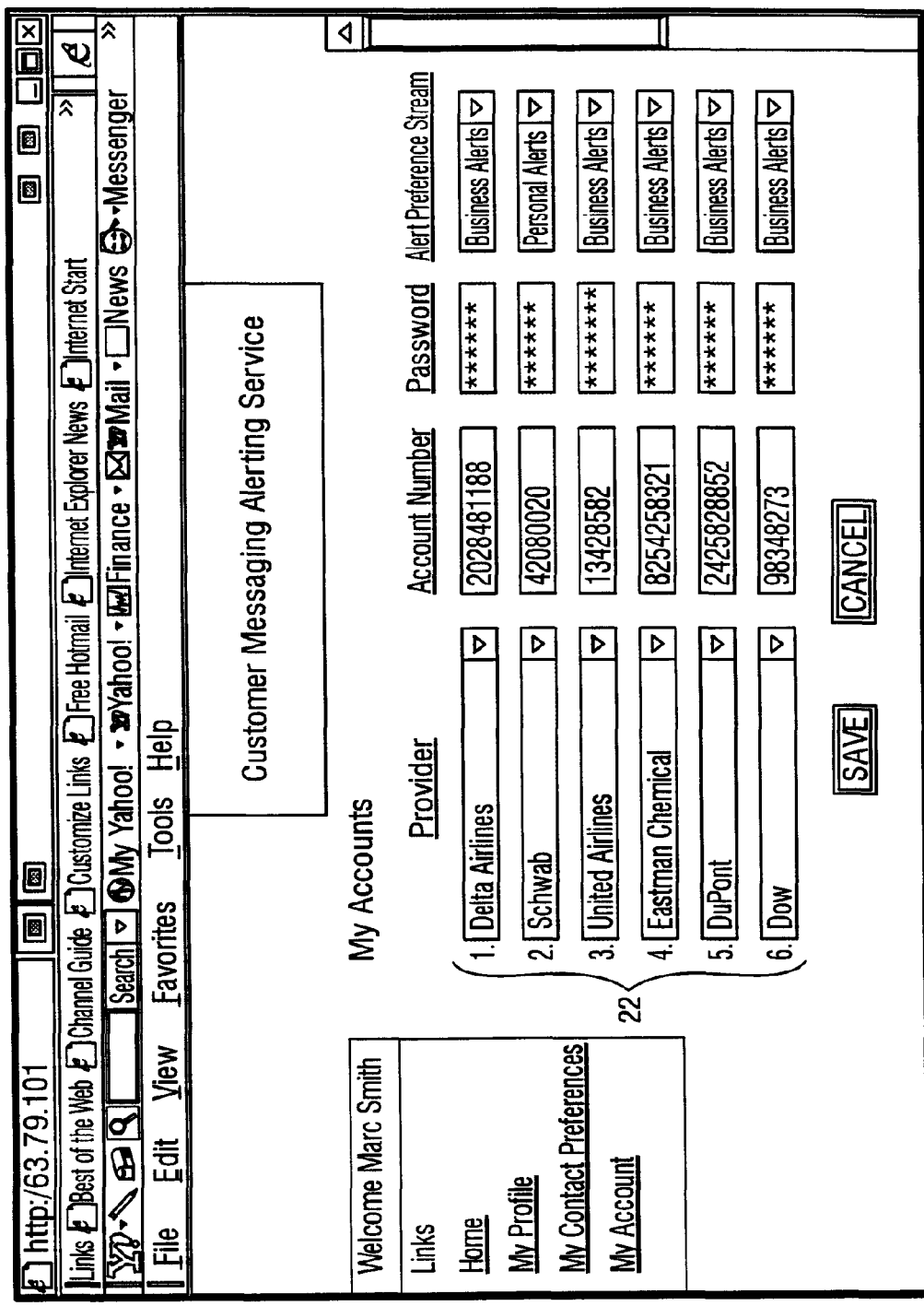

FIGS. 2A-2C are simplified computer screen shots showing how a customer, "Marc Smith", enrolls himself by using a personal computer and accessing the CMAS website. In FIG. 2A, the customer enters various contact information 20a to 20f or alerting media, including various instant-messenger accounts 20b to 20d. Next, in FIG. 2B the customer indicates company preferences to control which businesses 22 may use the alert infrastructure (the businesses are all CMAS subscribers or CMAS affiliated enterprises in this example). Lastly, the customer enters his contact preferences hierarchy 24a to 24c, and whether or not confirmation 26a to 26c is required for each of the notification channels. In particular, when one of the information providers 22 (FIG. 2B) issues an alert, then an attempt to contact Marc Smith will be made first via AOL Instant Messenger™ 24a, then via a text pager 24b, and lastly via a mobile phone 24c. The first two preferred notification channels require confirmation 26a, 26b, but if communication via these channels is unsuccessful, then mobile phone 24c communications will be attempted which does not require confirmation 26c.

Once a customer is enrolled, CMAS monitors for relevant alert events from that customer's preselected companies and provides alert messages as they occur. FIG. 2D is a list of the types of customer profile information that a CMAS system may include. Each customer has full access to their profile settings and subscriptions and may modify the setup at any time. This "permission marketing" orientation permits customers to shape interactions to their preferences, and results in a "cockpit" for the customer for all suppliers. That is, the customer has a means for grouping all of her business contacts together in one integrated system. In addition, the customer may be able to subscribe for personal service messages or other options provided by businesses, which may be provided on a scheduled basis. Customers could also receive event reminders regarding scheduled tasks or required responses.

CMAS may share some relevant profile data with subscribing companies that is centrally maintained. Such data is typically identification and demographic data that may be used for marketing or personalization purposes. For example, a business may use the customer's name in an automatically-generated greeting when first contacted, and may use other customer data such as the customer's preferences to generate alert messages. For example, customers who are "Gold" frequent flyers may receive different or fewer alert messages than customers who are "Platinum" frequent flyers.

A customer using a personal computer may also be viewing a business website and notice a CMAS option. The customer may navigate to that section and decide to enroll in the service. The CMAS site may be "deep linked" inside many companies web sites (Frame or redirected URL). The customer feels as though she is on the originating company's web site, but is really on a co-branded version of the CMAS site. The enrollment process is similar to that described above. In particular, during the process the customer is introduced to CMAS and the services that are available. The customer may be educated about the other companies that utilize the CMAS service for alerting, and may include then when enrolling. If, for example, the customer happens to be at the website of a parcel delivery company when enrolling, then the CMAS is preconfigured to at least include delivery company enabled alerting for this customer. The customer receives an enrollment confirmation e-mail, which may include an invitation to enroll for alerting services from other companies. A link to the CMAS web site may also be included in the e-mail. CMAS then begins to 'monitor' for relevant alerts for the enrolled customer.

A customer may also enroll to use CMAS by using other communication devices. For example, the customer may use a telephone to call a customer service center and orally give the required information to a customer service representative who enters the data into the system.

Figure 3B:
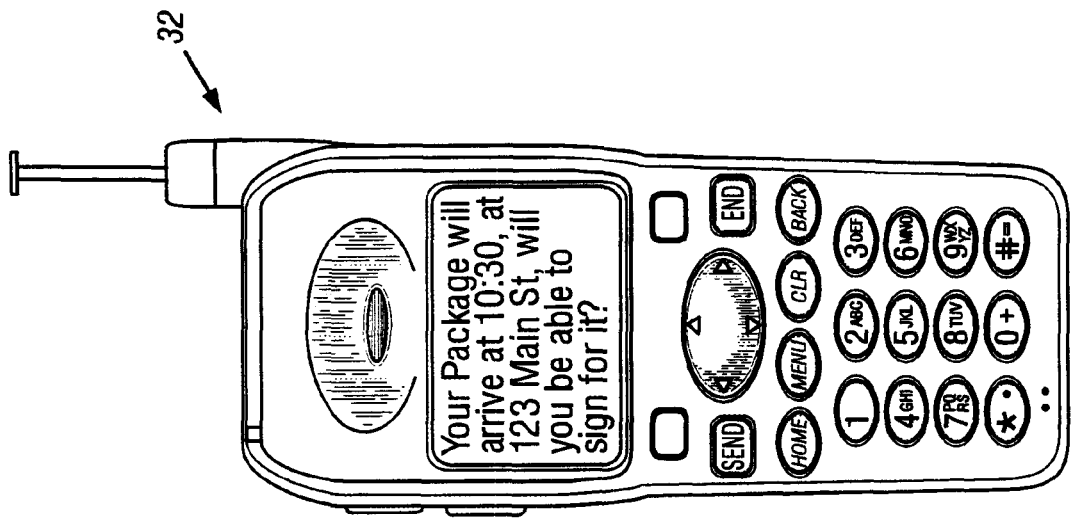
FIG. 3 illustrates an example of how a business uses CMAS to communicate with a customer.
Figure 3A:
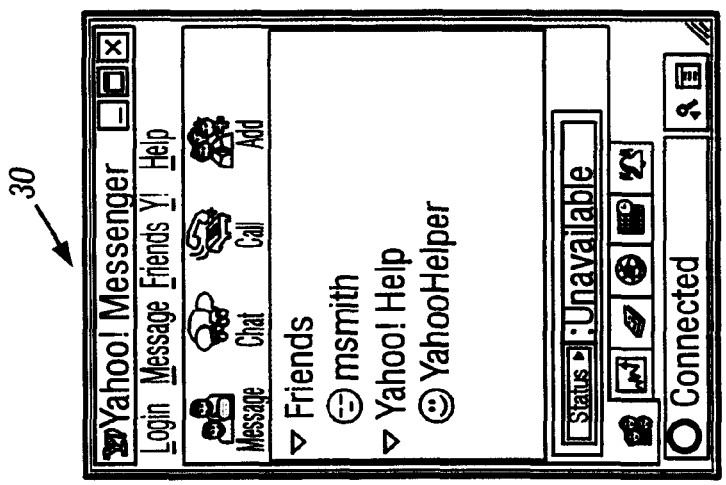

FIG. 3 illustrates an example of how CMAS works for an enrolled customer, Marc Smith. In this example, a package requiring a signature is scheduled to be delivered, and thus CMAS notifies Mr. Smith according to his stated preferences to ensure that he will be available for signature. The package delivery company initiates a customer alert to Marc Smith via CMAS identifying the requirement for him to confirm that he will be available to sign for the package. Such messages may be automatically generated by the CMAS engine according to customer preferences and the CMAS engine suggested protocols. CMAS attempts to notify on Mr. Smith's first media preference 30 (Yahoo! Instant Messenger) but determines that he is unavailable on that media. Next, CMAS automatically escalates to his second media preference, and Marc Smith is successfully alerted on the second preference, which is by short message system 32 (SMS) on his cell phone. The message requires a response, so Marc Smith can reply using any of the communication devices that he indicated upon enrollment in CMAS. For example, Marc Smith may respond via e-mail that he will be unavailable at the scheduled delivery time, and suggest a delivery time of 3:00 p.m. He may also request to continue the present communication by e-mail, or else the package delivery company will continue it by using the "originating media", which was SMS in this example. On some occasions, CMAS recommends a media change when it detects human assistance may be required. This may occur, for example, when CMAS cannot identify a natural language query after three tries, and then will suggest and then initiate a call to the customer from a customer service representative. Otherwise, the communication remains in the originating media unless the customer requests a change to another media. Returning to the present example, the delivery company, utilizing the CMAS engine, responds and offers alternate delivery times and requests that Marc Smith choose one of the offered selections. Once the customer responds by picking a delivery time the delivery company may transmit a confirmation communication such as a confirmation e-mail.

The CMAS engine, when operable to send an alert to a customer, will follow the customer hierarchy list of communication types until the list is exhausted. In some implementations, the string of communication types is followed once, and is not repeated once exhausted. However, CMAS may be configured to try the string of communication types two or more times if needed, and to report such activity to the alerting business.

In another example, a customer wishes to obtain tracking information from his package delivery company. FIGS. 4A to 4D illustrate how CMAS can be used to perform such tasks. In particular, the customer uses the Yahoo! Messenger® instant messaging system to request the location and status 40 of his order from his package delivery company.

Figure 4A:
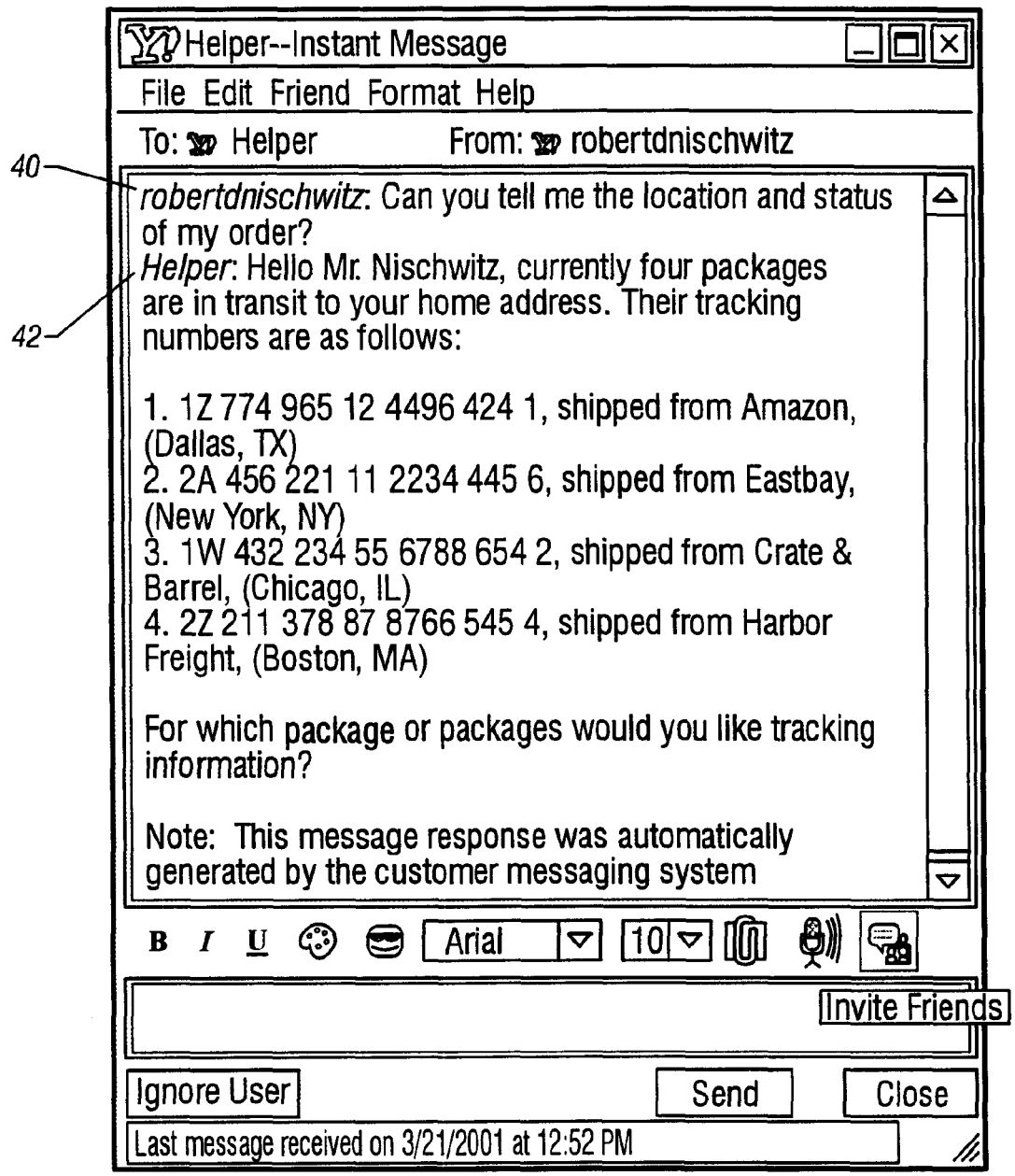
FIGS. 4A-4D illustrate an example of CMAS communications between a customer and a package delivery company.
Figure 4B:
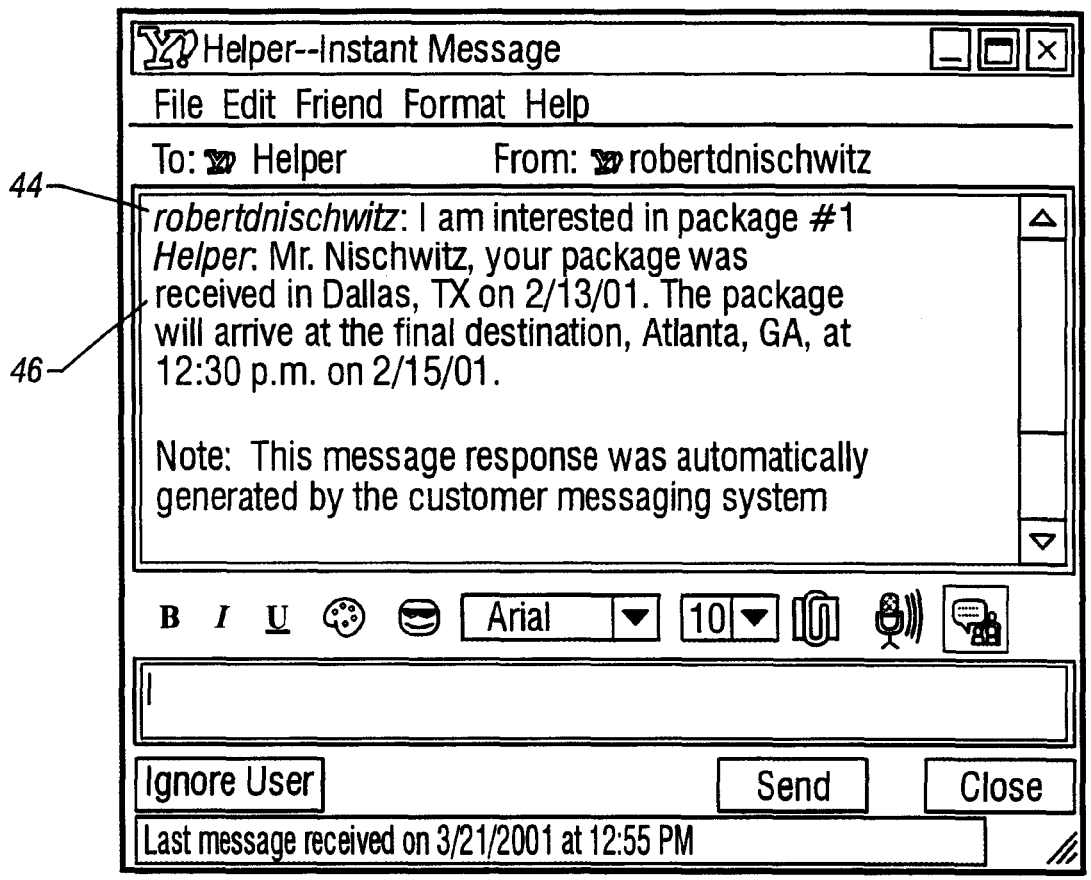
Figure 4C:
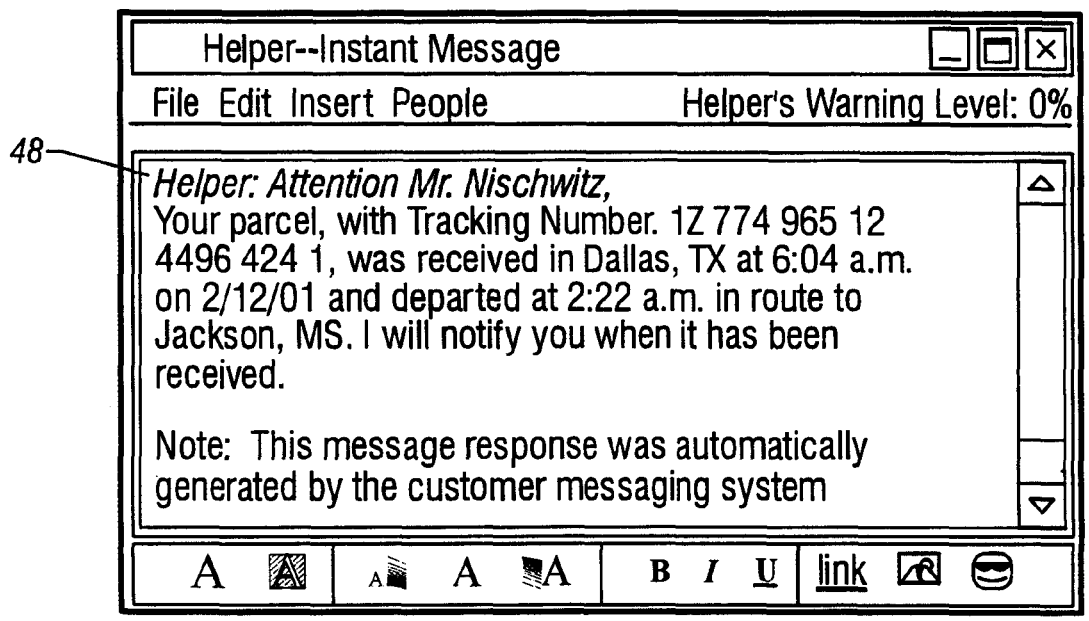
Figure 4D:
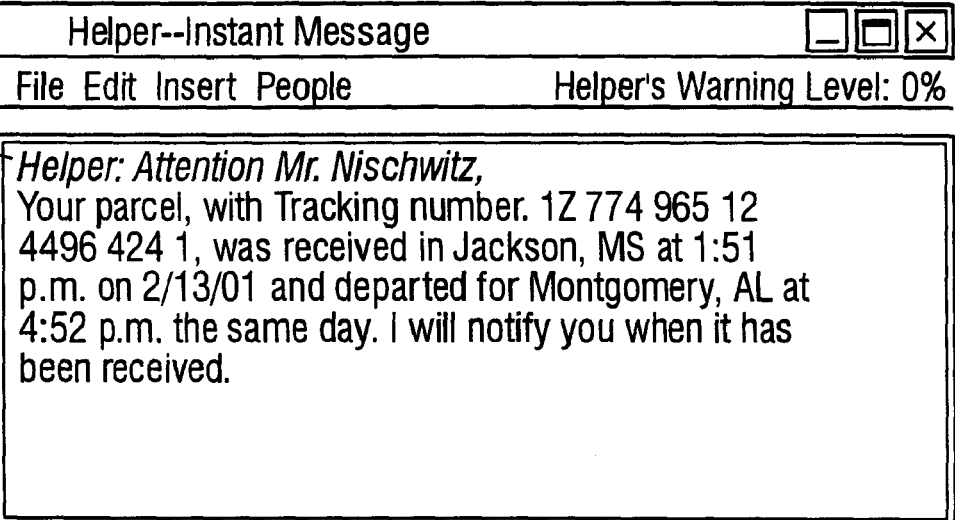
Figure 4D:
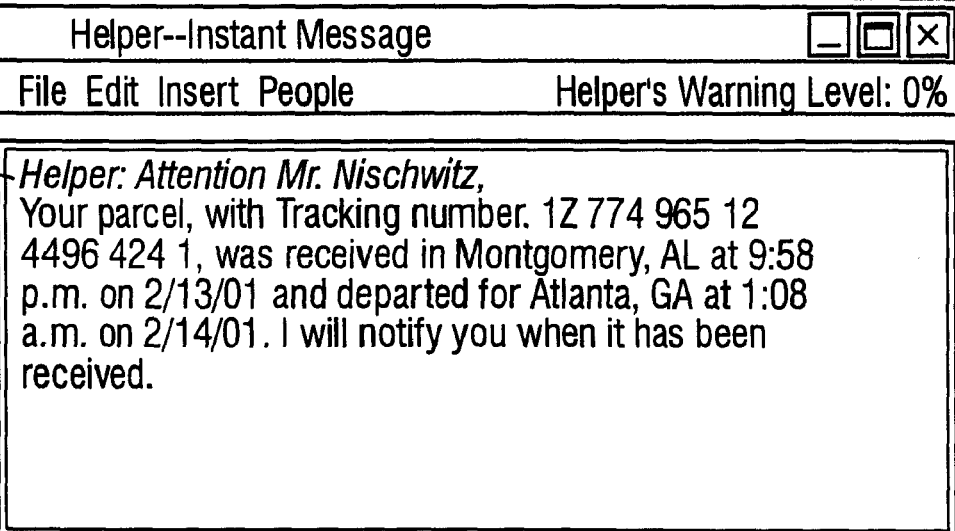
Figure 4D:
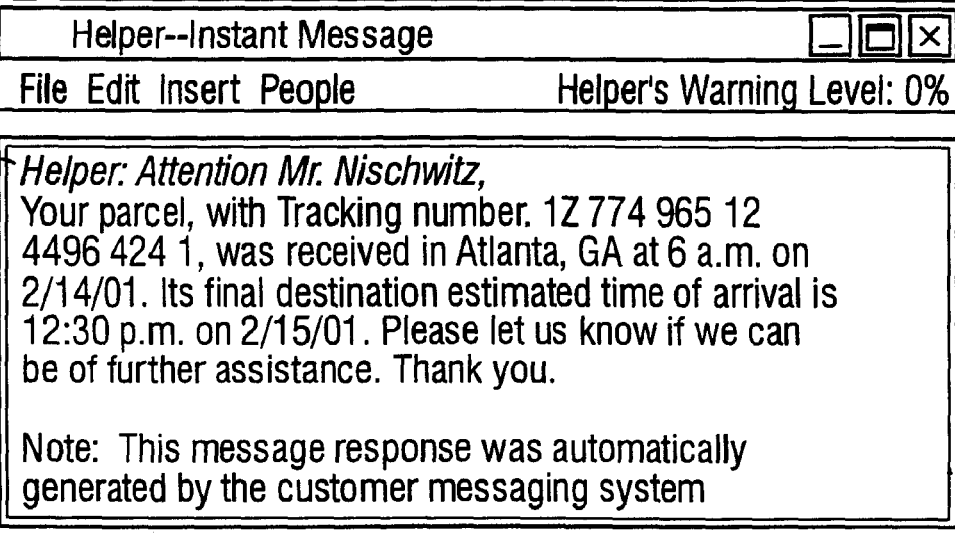

CMAS identifies and authenticates the customer, interprets the natural language request, automatically extracts the tracking number, and retrieves the status information from the delivery company. CMAS then formats the response appropriately based on the customer's message service and returns a response 42 to the customer. The customer, as shown in FIG. 4B, then indicates that he is interested in package number one, and the CMAS engine obtains detailed tracking information 46. In the example of FIGS. 4C and 4D, the customer wishes to be notified of the status of his package delivery bound for Atlanta. The package delivery company sends alerts 48, 50, 52 and 54 as the package is received and transported from various locations enroute to its final destination of Atlanta. In this example, the package was received in Dallas on February $12^{th}$ and shipped to Jackson, Miss., then to Montgomery, Ala., and lastly arrived in Atlanta on February $14^{th}$. A final estimated destination time of arrival is also communicated. In the example shown in FIGS. 4A to 4D, the message responses were automatically generated by the package delivery company using the CMAS engine.

It should be understood that CMAS could be used in many different situations to both communicate customer requests to different companies, and to communicate alerts or other information from different companies to customers. For example, a customer could request to be alerted whenever a stock market event occurs based on his predefined preferences. The customer would then be able to act upon that information by contacting a customer service representative such as a stock broker, or access a financial website, for example. In another example, a customer may send an instant message requesting shipment status of a critical component needed for an upcoming production run. CMAS first interprets the natural language request for routing to the appropriate business unit and then identifies the requestor, identifies his employer, and then authorizes a response to the inquiry. The supplier company then utilizes the CMAS engine to complete the response by automatically generating a reply message based on a predefined list of company-specific and business appropriate language replies. In yet another example, a frequent traveler preparing for a business trip could request flight status information including the departure gate in a natural language inquiry. The CMAS engine interprets the natural language request, routes it to the appropriate airline, and responds with the information. The customer then may ask if she has been upgraded, and the CMAS engine again interprets the request, routes it to the airline and sends an appropriate response. An alert could also be sent by the airline to the frequent traveler in the event that her flight has been delayed or cancelled.

As described above, a customer may enter a natural language request and the CMAS engine will attempt to interpret the request. The CMAS engine will use the "corporate persona" the customer selected (e.g., an "Airline company Helper" in AOL Instant Messenger) to identify the business to which the request may be directed. The CMAS engine will identify the customer initiating the request by translating their service identity (e.g., their "screen name" in AOL Instant Messenger) into a specific customer identity. The CMAS engine will extract data from the natural language request and use that data to complete the business transaction. The status of such requests may be tracked, and an audit history reported to the business concerning the number of successes or failures, and the type of failures that occurred.

The interpretation of a customer's natural language request may involve using a customer intent processor that is asynchronous, customer media independent, that includes a timeout and/or aging mechanism, and that includes an interface to a content management engine to retrieve approved alert text for an outbound alert. Several common customer intents may be accessible from every enterprise version of CMAS, such as a help request, a provider inquiry, a profile update request and a human escalation request (i.e. instead of a machine generated response, the customer will be directed to speak to a human representative).

The customer intent data may be provided by companies affiliated with the CMAS service, and may be modified or expanded depending on the audit history of its customers. For example, a package delivery company may recognize various natural language queries phrased as "what is the status of my package?" or "when will my package be received?" or "when will I receive my order?" to all pertain to a request for shipment tracking associated with that customer. A list of possible shipments could be supplied so that the customer can select the package information of interest. Other inbound customer requests for information that would be recognized by a package company may include: shipment tracking by tracking number, shipment tracking by info/notice, shipment tracking by reference number, schedule shipment delivery, shipment cost inquiry, schedule parcel pickup, waive signature requirement, transit time inquiry, drop off location inquiry, hold mail request, postal code lookup, and change of address request. Outbound messages or alerts that may be automatically generated by the package delivery company may include: delayed shipment notification, driver en route notification, and shipment tracking information.

The customer "intents" are business-specific, and may be somewhat different or totally different from one business to another. For example, a financial services company may recognize inbound customer natural language requests for such information as balance inquiries, stock price inquiries, brokerage orders, rate inquiries, and payment/transfer orders. Outbound messages or alerts that may be automatically generated and transmitted to customers may include equity portfolio notice, suspicious (credit card) transaction notices, check overdraft/overlimit warnings, and special offer/rate notices.

Figure 5A:
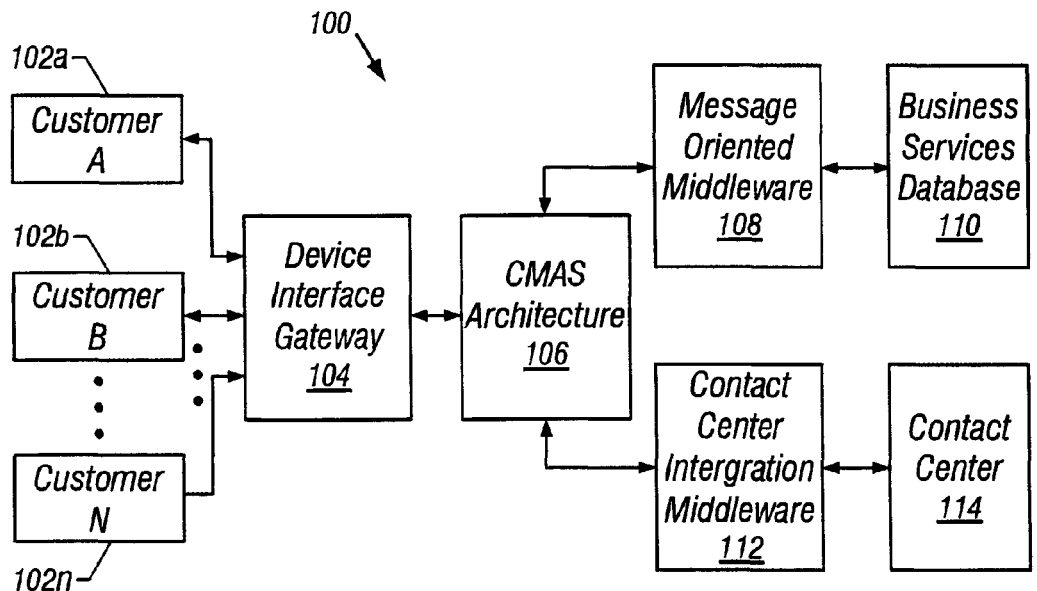
FIG. 5A is a simplified block diagram of an implementation of a CMAS system according to the invention.

FIG. 5A is a simplified block diagram of an implementation of a CMAS system 100. Customers 102a to 102n each sign-up or enroll for the CMAS services as described above, each indicating which businesses, what types of messages they wish to receive, and how each customer wishes to receive communications. A device interface gateway 104 is capable of receiving and passing messages from customers 102a-102n onto a CMAS application architecture service 106. The device interface gateway is configured to translate each received message from a customer into data that the CMAS application architecture package 106 can utilize. The CMAS application architecture bundle 106 is also connected to message-oriented middleware 108 which is connected to a plurality of business services databases 110. In addition, the CMAS application architecture bundle 106 may be connected to a contact center 114 via a contact center integration service 112. The CMAS engine is therefore a collection of software, hardware and communication infrastructure required to maintain CMAS services.

Figure 5B:
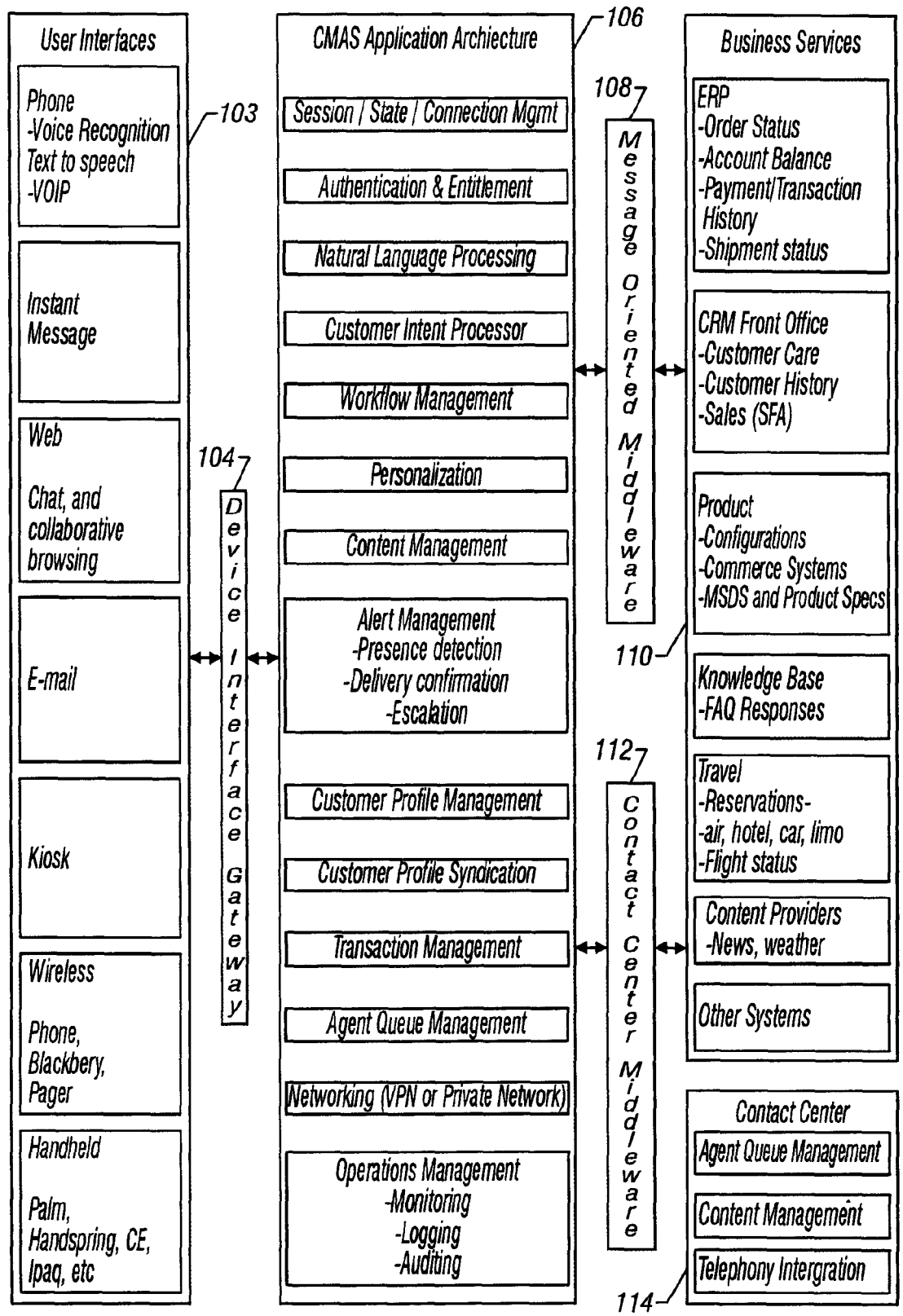
FIG. 5B is an implementation of the CMAS architecture of FIG. 5A.

FIG. 5B shows an implementation of the CMAS architecture 106. A customer may utilize any of a plurality of user interfaces 103 to communicate with the CMAS engine through the device interface gateway 104. In this example, the device interface gateway 104 is configured to receive analog or digital telephone messages, digital instant messages, web-based requests and data, e-mail, kiosk-based data, wireless data from many different types of devices (pagers, cell phones, etc.), data from handheld personal digital assistant devices, and the like. The CMAS application architecture 106 may be a bundle of hardware devices and software modules configured to perform session management, perform state management, perform connections management (session timeouts and session termination, etc.), authenticate customers, determine entitlement of customers to receive certain information if required, conduct natural language processing, conduct workflow management, handle customer personalization processes, perform content management, perform alert management (detect presence of an alert, send alert using message hierarchy of each customer to which the alert pertains, and obtain delivery confirmation if required), perform customer profile management, handle customer profile syndication, handle transaction management, handle agent queue management, handle networking protocols (VPN or private network) and perform operations management functions (reporting, monitoring, logging and auditing operations). Some of these operations may be performed by vendor software running on various computer platforms, while other operations may consist of proprietary software code that has been developed and maintained by one or more of the affiliated businesses. The CMAS application architecture 106 is also connected to business services databases 110 through message oriented middleware 108. The business services databases 110 may include information from multiple companies concerning business-specific data. Such databases may include, for example, order status reports, account balances, payment and/or transaction histories, and shipment status for a delivery company; product configurations, commerce systems and product specifications for a consumer product company; travel reservation data for airfare, flight status, hotel accommodations, and car and/or limousine rental for a travel agency; news data, weather conditions and other data from content providers; and other business services databases. Customer-care data, such as customer history data and sales data, may also be included. The CMAS application architecture 106 may also be connected to a contact center 114 through contact center middleware 112. The contact center 114 may include customer service representatives that are familiar with one or more of the affiliated businesses and are available to communicate directly with customers. Functions performed by software of the contact center integration service 112 may include agent queue management, context management and computer telephony integration. It should be understood that the device interface gateway 104, the CMAS application architecture 106, the message oriented middleware 108 and the contact center integration service 112 may include software and hardware developed by many different vendors or software companies for performing the various tasks required to achieve the various customer care goals of the customer messaging service.

The CMAS application architecture 106 may be configured to remotely support customer profile management of customer profile data maintained by affiliated businesses. Thus, customer profile data need not be stored in a centralized location.

The CMAS application architecture 106 may also be configured to authenticate customers and identify which accounts that customer is entitled to access, by validating a password, for example. Authentication may be at an individual level (single customer) or at a group level (business entity). FIG. 5C is a table 125 illustrating examples of "native" authentication mechanisms available in column 127 depending on the communication device or communication media used in column 126. Column 128 illustrates the secondary or CMAS managed authentication mechanism, column 129 indicates if a cookie computer file is generated (customer data file), and column 130 generally indicates if another measure is provided, such as security measures. For example, if a customer uses a cell phone to access the CMAS service, a password may be required, a CMAS user ID/Password is required, she can then access a business based on her user profile, no cookies will issue, and security is that provided by the cell phone service provider.

FIG. 5D is a service and delivery information table 135 illustrating the types of services and devices that may be supported by CMAS. Service providers listed in column 136 may support the devices listed in column 138 and may provide presence detection (column 140), delivery confirmation (column 142), guarantee delivery (column 144) and provide receipt acknowledgement (column 146). Receipt acknowledgment may be native, meaning automatically generated by the service (sub-column 147) or manual (column 149), meaning that a customer would have to respond by performing some type of action such as sending a reply e-mail. For example, referring to column 136 a customer may use the service provided by either AOL, Yahoo! Or Microsoft and a device supporting that company's version of instant messaging, and would be detected if on-line (check mark in column 140), but delivery confirmation (column 142) or guaranteed delivery (column 144) of a message could not be promised, and the customer would have to reply manually (check mark in column 149) if a receipt acknowledgement was requested. Thus, the presence detection, delivery confirmation, guaranteed delivery and receipt acknowledgement features depend upon the service and the device used by a customer.

Figure 5E:
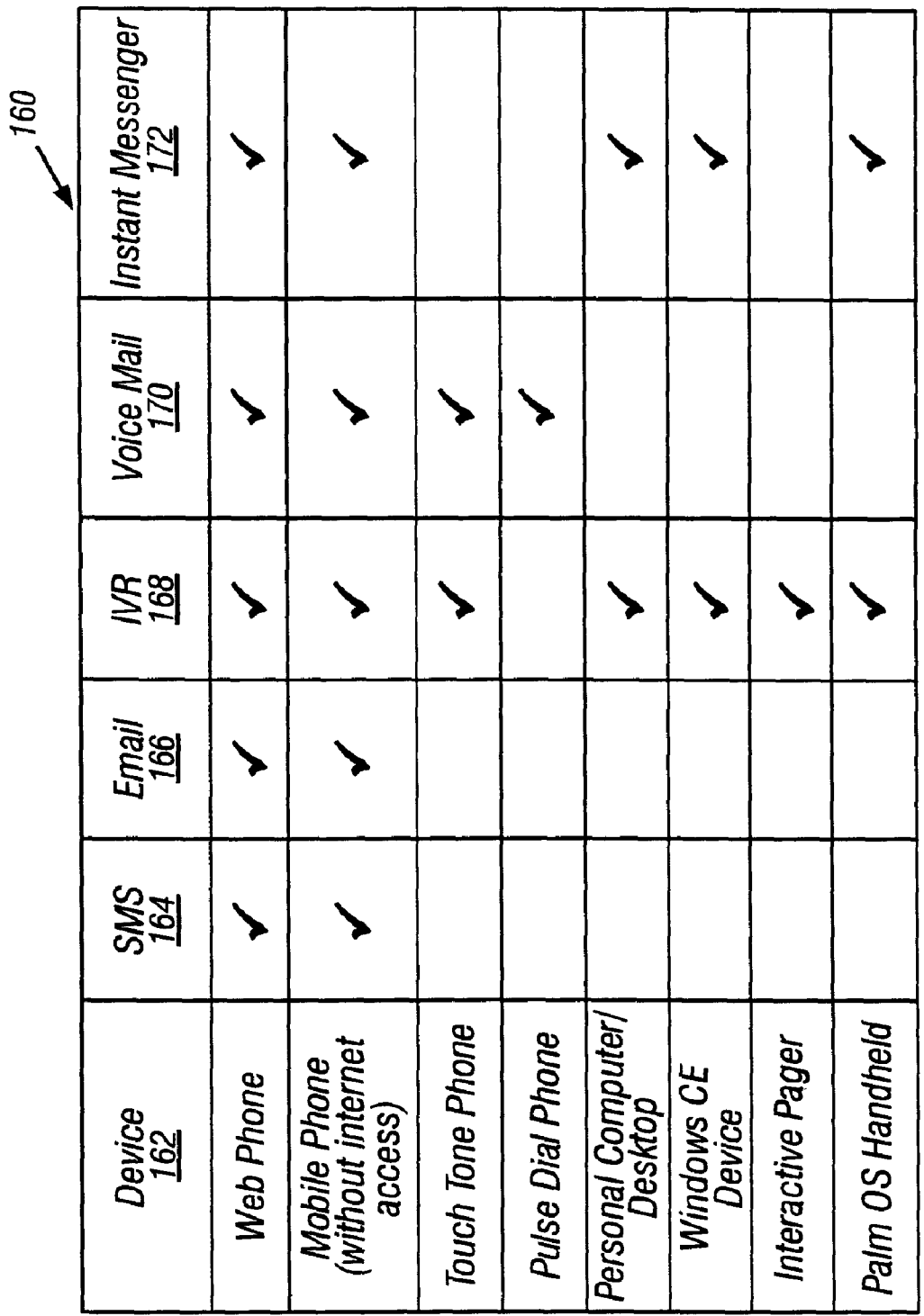
FIG. 5E is a device table illustrating the types of devices that may be supported by a CMAS system according to the invention.

FIG. 5E is a device table 160 illustrating the types of devices (column 162) that may be supported by CMAS, and the services supported on those devices that CMAS may use. In particular, short message system (column 164) may be supported by web phones and mobile phones and used by CMAS; e-mail (column 166) may be supported by all the listed devices, except for a touch-tone phone and a pulse dial phone, and used by CMAS; IVR which stands for "interactive voice response" (column 168) may be supported by Web Phones, mobile phones and touch tone phones and used by CMAS; voice mail (column 170) may be supported by web phones, mobile phones, touch tone phones and pulse dial phones and used by CMAS; and instant messenger (column 172) may be supported by all listed devices except for touch tone and pulse dial phones, and used by CMAS.

The CMAS application architecture may also be capable of providing predefined reports to businesses to support operations. For example, reports concerning completed transaction summaries by enterprise, peak number of transactions by channel by enterprise, transaction failure by channel by enterprise, transaction frequency by channel and customer intent, transaction summary by customer intent and channel, and transaction failure by customer intent by enterprise may be provided to each business for analysis. Each business can use such information to improve its customer services.

The CMAS application architecture 106 includes contact management features that are driven by the need to manage message content and format, both from customers and from businesses. Message templates may be provided for use in formatting responses to customer messages and to format customer alert messages. Message management includes the ability to define message content templates for each target platform, the ability to preview message content in each target platform, and the ability to stage message templates for scheduled promotion to the production environment. For example, depending on who the customer may be, a business may use a particular font color scheme and letter sizes to present certain messages. Each business defines its own content and presentation parameters while the CMAS architecture provides a means to deliver the messages to customers.

Figure 6A:
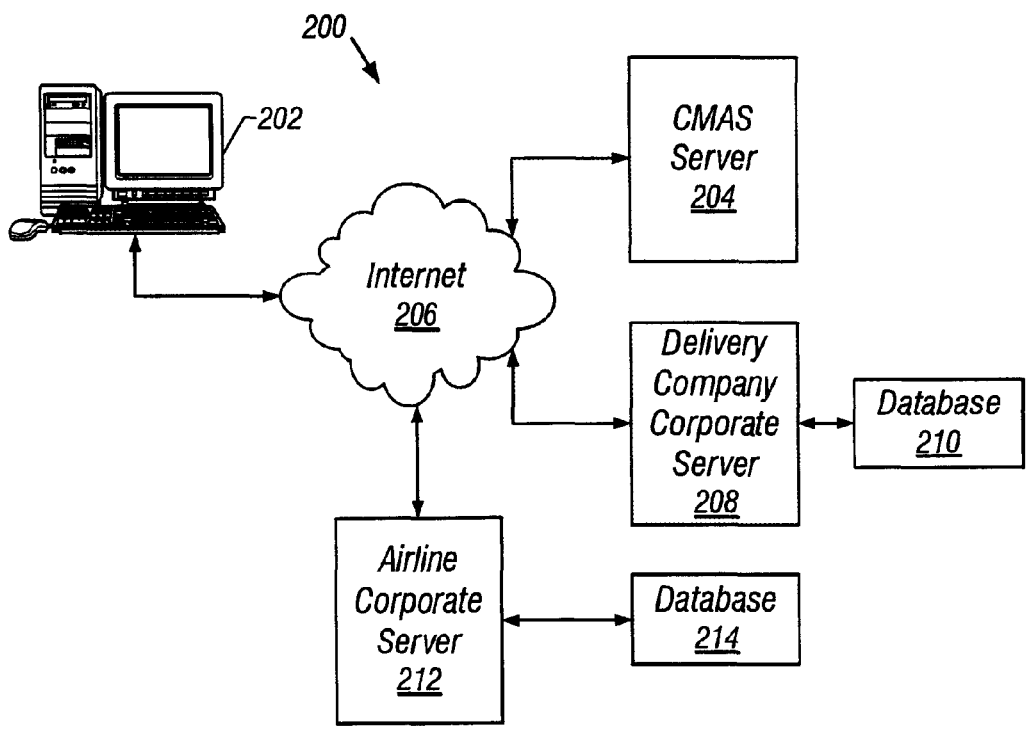
FIG. 6A is a simplified block diagram of an example of a customer configuration for accessing the CMAS service to communicate with one or more businesses.

FIG. 6A is a simplified block diagram 200 of a business configuration wherein a customer uses a personal computer 202 to access the CMAS website provided by the CMAS server 204 over the internet 206. The customer may use her personal computer (PC) to enroll in the CMAS service, to request information from affiliated companies, and to receive alerts from the companies. For example, the customer may log on to the CMAS website by using a Microsoft Passport™ identification, and if the customer does not have an identification then she will be presented with a sign-in menu. (Microsoft Passport™ software provides a single sign-in service that enables businesses to provide a fast and convenient way for customers to sign-in and communicate securely.) Once the customer has signed-up or enrolled, CMAS begins monitoring for relevant alert messages and also permits the customer to request information of affiliated companies. In the example shown in FIG. 6, the CMAS server 204 is connected to a delivery service corporate server 208 and associated database 210, and to an airline corporate server 212 and associated database 214. Many other companies or enterprises could also be connected, either via the internet or dedicated lines or by other means, to the CMAS server. In this manner, the customer PC can communicate with businesses specified by the customer, and the businesses may communicate by various other means, such as by transmitting messages to another customer device, as explained above.

Figure 6B:
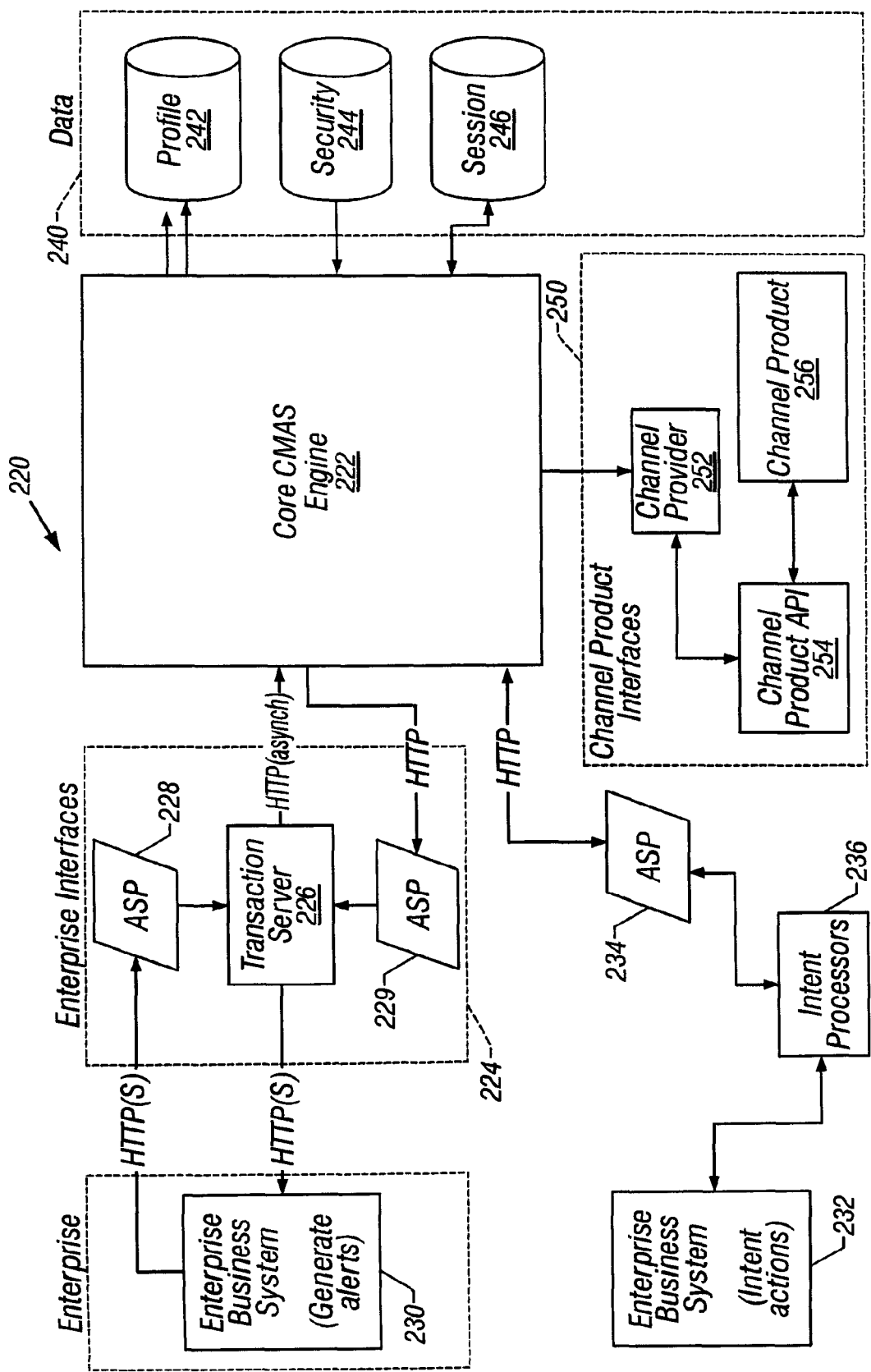
FIG. 6B is a simplified block diagram of an implementation of systems that may interface with a CMAS engine according to the invention.

FIG. 6B is a simplified block diagram 220 of an implementation illustrating how a business enterprise system may interface with the CMAS engine 222. As explained above and as shown in FIG. 6B, CMAS supports multiple interfaces with diverse systems. The core CMAS engine communicates with a business through an enterprise system 224 that may include a transaction server 226 and active server pages (ASP's) 228,229 which may be connected to an enterprise business system 230 for generating alerts. For example, if the business enterprise is an airline, then the system 230 may generate alerts for customers that are scheduled to fly on certain flights that have been delayed due to bad weather conditions. The CMAS engine may also be connected to an enterprise business system 232 through an ASP 234 and an intent processor 236 for interpreting customer natural language queries. Channel product interfaces 250 (channel provider 252, channel product API 254 and channel product 256) are used by the CMAS engine to define communications with different services and customer devices. Lastly, the CMAS engine is configured to communicate with databases 240 that may include a profile database 242, security database 244 and session database 246.

The CMAS inbound interface may handle communications through an e-mail, a HTTP request, a request through an Instant Messenger, or query from one or more databases. Use of an XML interface ensures that these requests through the inbound interfaces are transformed into system inputs. The transaction server 226 ensures that such requests are interpreted by CMAS. CMAS may handle any outbound requests through vendor software.

Figure 7:
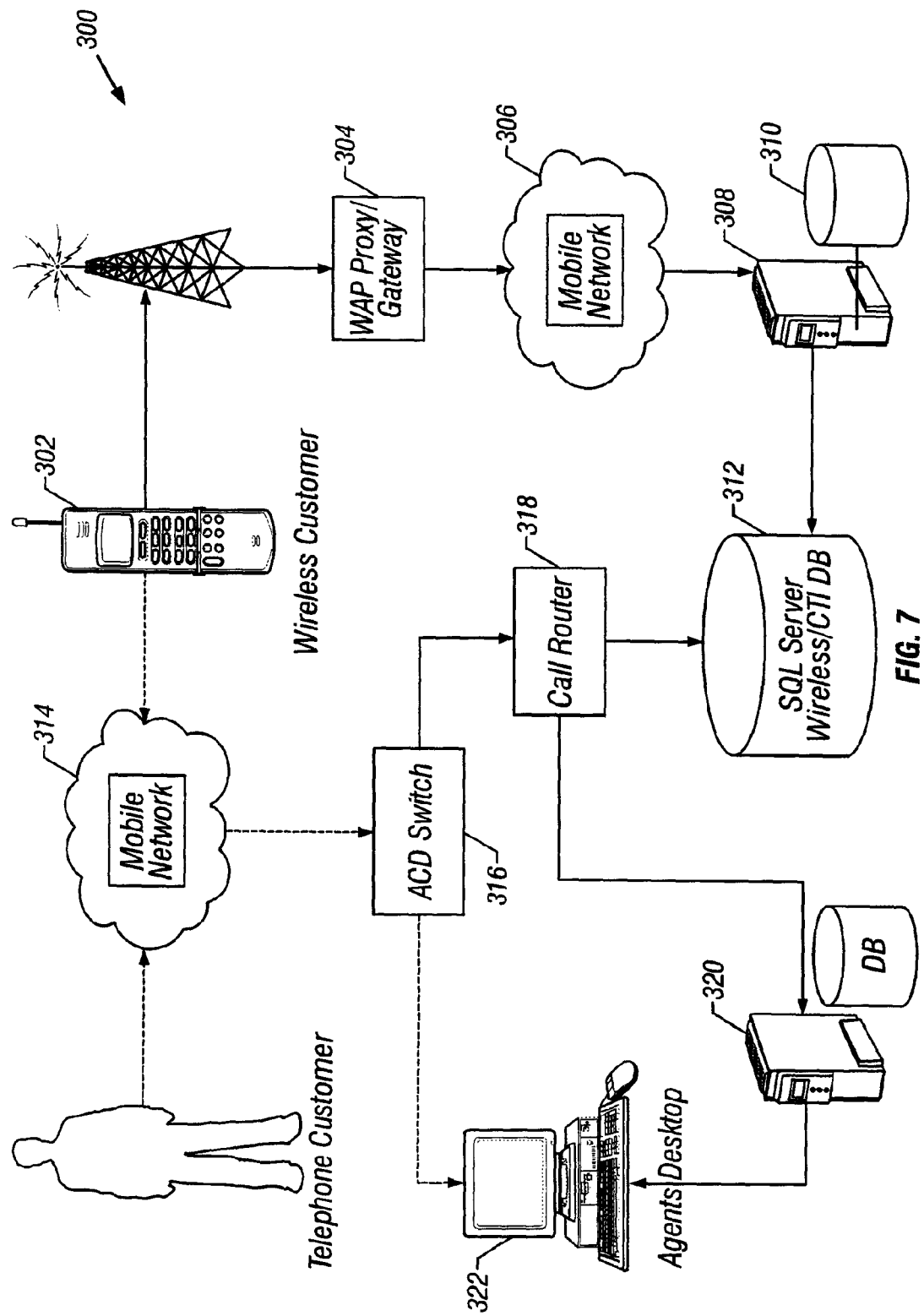
FIG. 7 is a simplified schematic diagram illustrating an example of how a customer may access CMAS via a wireless device.

FIG. 7 is a simplified schematic diagram 300 illustrating an example of how a customer could access CMAS via a wireless device 302. The system 300 bridges the customer voice channel to the data channel of various businesses. Today's web-phone technology can operate in either a voice mode or a web-browser mode, but cannot operate in both mediums simultaneously. In this example the customer pushes "call CSR" (call customer service representative) on a wireless application protocol (WAP) telephone 302, which connects via a WAP gateway 304 to a mobile internet network 306 which retrieves customer information from a wireless server 308 and associated database 310. The wireless server then writes information about the caller and web context to a database server 312 based on a database lookup of the phone number of the user, and based on a database search of the CSR phone number. The database server 312 may obtain data such as context information of the user, the name of the user, the business function-(Order, Service Request, etc.) and the business item (order number). In this case, a confirmation page is then displayed on the WAP telephone 302 instructing the customer to call a customer service representative. The customer accepts this advice and the WAP telephone 302 then disconnects from the internet and places a call via a mobile network 314. The call is routed to an Automatic Call Distributor (ACD) 316 which recognizes that the customer is a WAP user via the Dialed Number Identification Service (DNIS) and identifies the specific customer via Automatic Number Identification (ANI) service 318. The ANI service 318 then retrieves user data from the database server 312, and sends the data to a contact server 320 for processing. The contact server 320 may process such data as the customer name, WAP user by DNI, business function and business item and then route the call to an agent at a desktop computer 322. The contact server 320 then transmits a "screen pop", which is an information display that comes up on the agent's computer screen which provides customer information to the agent such as the customer's name, business function and history of prior questions asked during such sessions. The agent or customer service representative may have, for example, information including a description of any problem from the beginning (for example, a recurring problem with a particular product may have been called in several times in the past by the customer) without having to ask the customer to reiterate the problem. The information permits a customer to bypass the conventional "voice response menu" designed to route calls to the correct contact person at the call center. Such a system alleviates customer frustration by helping to solve problems in a timely manner. The system 300 therefore logically bridges the data channel to the voice channel, and is useful to a customer because it can be used to bypass the typical voice response menu typically used by customer service telephone centers.

A number of implementations of the invention have been described. Nonetheless, it should be understood that various modifications could be made without departing from the spirit and scope of the invention. Accordingly, other implementations are within the scope of the following claims.

What is claimed is:

1. A computer system comprising:
   at least one computer; and
   at least one non-transitory computer-readable medium coupled to the at least one computer having instructions stored thereon which, when executed by the at least one computer, cause the at least one computer to perform operations comprising:
   receiving, by at least one computer of a communication service and from a customer, a natural language query directed to a business, the communication service facilitating communication between a plurality of customers including the customer and a plurality of businesses including the business to which the natural language query is directed;
   identifying, by at least one computer of the communication service and from among the plurality of businesses, the business to which the natural language query is directed based on at least one attribute of the natural language query;
   in response to identifying the business to which the natural language query is directed, automatically generating, by at least one computer of the communication service, a reply message to the natural language query based on a predefined list of appropriate replies specific to the identified business; and
   sending, from at least one computer of the communication service to the customer, the generated reply message.

2. The computer system of claim 1 wherein the operations further comprise:
   extracting, by the at least one computer, data from the natural language query;
   generating, by the at least one computer, an inquiry message to the identified business requesting information based on the data extracted from the natural language query;
   sending, from at least one computer of the communication service to the identified business, the generated inquiry message;
   receiving, by at least one computer of the communication service from the identified business, a response message including the requested information;
   formatting, at the communication service, the response message based on profile information of the customer; and
   sending, from at least one computer of the communication service to the customer, the formatted response message.

3. A method for handling communication between customers and businesses comprising:
   receiving, by at least one computer of a communication service and from a customer, a natural language query directed to a business, the communication service facilitating communication between a plurality of customers including the customer and a plurality of businesses including the business to which the natural language query is directed;

identifying, by at least one computer of the communication service and from among the plurality of businesses, the business to which the natural language query is directed based on at least one attribute of the natural language query;

in response to identifying the business to which the natural language query is directed, automatically generating, by at least one computer of the communication service, a reply message to the natural language query based on a predefined list of appropriate replies specific to the identified business; and sending, from at least one computer of the communication service to the customer, the generated reply message.

4. The method of claim 3 further comprising:

extracting, by the at least one computer, data from the natural language query;

generating, by the at least one computer, an inquiry message to the identified business requesting information based on the data extracted from the natural language query;

sending, from at least one computer of the communication service to the identified business, the generated inquiry message;

receiving, at least one computer of the communication service from the identified business, a response message including the requested information;

formatting, at the communication service, the response message based on profile information of the customer; and sending, from at least one computer of the communication service to the customer, the formatted response message.

5. A non-transitory computer-readable medium encoded with a computer program comprising instructions that, when executed, operate to cause a computer to perform operations comprising:

receiving, by at least one computer of a communication service and from a customer, a natural language query directed to a business, the communication service facilitating communication between a plurality of customers including the customer and a plurality of businesses including the business to which the natural language query is directed;

identifying, by at least one computer of the communication service and from among the plurality of businesses, the business to which the natural language query is directed based on at least one attribute of the natural language query;

in response to identifying the business to which the natural language query is directed, automatically generating, by at least one computer of the communication service, a reply message to the natural language query based on a predefined list of appropriate replies specific to the identified business; and sending, from at least one computer of the communication service to the customer, the generated reply message.

6. The computer-readable medium of claim 5, wherein the operations further comprise:

extracting data from the natural language query;

generating an inquiry message to the identified business requesting information based on the data extracted from the natural language query;

sending, to the identified business, the generated inquiry message;

receiving, from the identified business, a response message including the requested information;

formatting the response message based on profile information of the customer; and sending the formatted response message.

7. The computer-readable medium of claim 5, wherein the operations further comprise:

extracting data from the natural language query;

generating an inquiry message to the identified business requesting information based on the data extracted from the natural language query;

sending, to the identified business, the generated inquiry message;

receiving, from the identified business, a response message including the requested information; and generating the reply message to the natural language query based on the requested information included in the response message.

8. The computer-readable medium of claim 5, wherein generating the reply message to the natural language query comprises:

extracting data from the natural language query;

using the extracted data to select, from the predefined list of appropriate replies specific to the identified business, an appropriate reply to the natural language query; and generating the reply message to the natural language query based on the selected reply.

9. The computer system of claim 1, wherein generating the reply message to the natural language query comprises:

extracting data from the natural language query;

generating an inquiry message to the identified business requesting information based on the data extracted from the natural language query;

sending, to the identified business, the generated inquiry message;

receiving, from the identified business, a response message including the requested information; and generating the reply message to the natural language query based on the requested information included in the response message.

10. The computer system of claim 1, wherein identifying the business to which the natural language query is directed based on at least one attribute of the natural language query comprises using a corporate persona the customer selected to identify the business to which the natural language query is directed.

11. The computer system of claim 1, wherein generating the reply message to the natural language query comprises:

identifying the customer initiating the natural language query by translating a service identity of the customer into a specific customer identity;

extracting data from the natural language query; and generating the reply message to the natural language query based on the extracted data and the specific customer identity.

12. The computer system of claim 1, wherein generating the reply message to the natural language query comprises interpreting the natural language query using a customer intent processor that is asynchronous, customer media independent, that includes a timeout mechanism, and that includes an interface to a content management engine.

13. The computer system of claim 1, wherein generating the reply message to the natural language query comprises using customer intent data provided by the identified business to select, from the predefined list of appropriate replies specific to the identified business, an appropriate reply to the natural language query and generating the reply message to the natural language query based on the selected reply.

14. The computer system of claim 1, wherein generating the reply message to the natural language query comprises:
  extracting data from the natural language query;
  using the extracted data to select, from the predefined list of appropriate replies specific to the identified business, an appropriate reply to the natural language query; and
  generating the reply message to the natural language query based on the selected reply.

15. The method of claim 3, wherein generating the reply message to the natural language query comprises:
  extracting data from the natural language query;
  generating an inquiry message to the identified business requesting information based on the data extracted from the natural language query;
  sending, to the identified business, the generated inquiry message;
  receiving, from the identified business, a response message including the requested information; and
  generating the reply message to the natural language query based on the requested information included in the response message.

16. The method of claim 3, wherein identifying the business to which the natural language query is directed based on at least one attribute of the natural language query comprises using a corporate persona the customer selected to identify the business to which the natural language query is directed.

17. The method of claim 3, wherein generating the reply message to the natural language query comprises:
  identifying the customer initiating the natural language query by translating a service identity of the customer into a specific customer identity;
  extracting data from the natural language query; and
  generating the reply message to the natural language query based on the extracted data and the specific customer identity.

18. The method of claim 3, wherein generating the reply message to the natural language query comprises interpreting the natural language query using a customer intent processor that is asynchronous, customer media independent, that includes a timeout mechanism, and that includes an interface to a content management engine.

19. The method of claim 3, wherein generating the reply message to the natural language query comprises using customer intent data provided by the identified business to select, from the predefined list of appropriate replies specific to the identified business, an appropriate reply to the natural language query and generating the reply message to the natural language query based on the selected reply.

20. The method of claim 3, wherein generating the reply message to the natural language query comprises:
  extracting data from the natural language query;
  using the extracted data to select, from the predefined list of appropriate replies specific to the identified business, an appropriate reply to the natural language query; and
  generating the reply message to the natural language query based on the selected reply.

\* \* \* \* \*

UNITED STATES PATENT AND TRADEMARK OFFICE
CERTIFICATE OF CORRECTION

PATENT NO.        : 8,243,893 B2                                    Page 1 of 1
APPLICATION NO.   : 12/689794
DATED             : August 14, 2012
INVENTOR(S)       : Hayes, Jr. et al.

It is certified that error appears in the above-identified patent and that said Letters Patent is hereby corrected as shown below:

Column 13, line 28 (line 11 of claim 4), please delete "at least" and insert -- at at least --, therefor.

Signed and Sealed this
Thirtieth Day of October, 2012

David J. Kappos
*Director of the United States Patent and Trademark Office*

UNITED STATES PATENT AND TRADEMARK OFFICE
CERTIFICATE OF CORRECTION

PATENT NO. : 8,243,893 B2  
APPLICATION NO. : 12/689794  
DATED : August 14, 2012  
INVENTOR(S) : Hayes et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 245 days.

Signed and Sealed this  
Eleventh Day of December, 2012

David J. Kappos  
*Director of the United States Patent and Trademark Office*